(12) United States Patent
Kim (10) Patent No.: US 9,787,347 B1
(45) Date of Patent: Oct. 10, 2017

(54) METAL FRAME FOR DEVICE BEING EQUIPPED WITH WIRELESS CHARGING TRANSMITTER OR RECEIVER

(71) Applicant: Jae Beom Kim, Seoul (KR)

(72) Inventor: Jae Beom Kim, Seoul (KR)

(*) Notice: Subject to any disclaimer, the term of this patent is extended or adjusted under 35 U.S.C. 154(b) by 0 days.

(21) Appl. No.: 15/464,356

(22) Filed: Mar. 21, 2017

(30) Foreign Application Priority Data

Mar. 22, 2016 (KR) .................. 10-2016-0033939

(51) Int. Cl.
*H04M 1/00* (2006.01)
*H04B 1/3888* (2015.01)

(52) U.S. Cl.
CPC .................................. *H04B 1/3888* (2013.01)

(58) Field of Classification Search
None
See application file for complete search history.

(56) References Cited

U.S. PATENT DOCUMENTS

2017/0187220 A1* 6/2017 Rosenfeld ............... H02M 1/44

FOREIGN PATENT DOCUMENTS

| KR | 10-2010-0014027 A | 2/2010 |
|---|---|---|
| KR | 10-2014-0008130 A | 1/2014 |
| KR | 10-2014-0008273 A | 1/2014 |
| KR | 10-2014-0104242 A | 8/2014 |
| KR | 10-2014-0113147 A | 9/2014 |
| KR | 10-2016-0028942 A | 3/2016 |

* cited by examiner

*Primary Examiner* — Mohammed Rachedine
(74) *Attorney, Agent, or Firm* — Park, Kim & Suh, LLC (57) ABSTRACT

Disclosed herein is a metal frame for a device being equipped with a wireless charging transmitter or receiver including a plurality of perforation holes configured in at least one partial area of the metal frame, wherein the perforation hole has a diameter ranging from sub nm to several μm, and wherein an average distance between an arbitrary point A on a circumferential surface of a perforation hole, among the plurality of perforation holes, and an arbitrary point B on a circumferential surface of another perforation hole being adjacent to the perforation hole is equal to or less than a skin depth corresponding to a metallic material of the metal frame, and wherein point A and point B respectively correspond to points indicating a longest distance between the circumferential surfaces of each perforation hole to which point A and point B belong.

Accordingly, the metal frame is expected to perform wireless charging by including at least a wireless charging receiver, i.e., enabling wireless charging to be carried out smoothly despite equipping a mobile device with a metal frame for its outer feature instead of a plastic frame, wherein the metal frame provides an excellent texture of premium quality and outstanding durability as compared to the plastic frame.

8 Claims, 9 Drawing Sheets

METAL FRAME FOR DEVICE BEING EQUIPPED WITH WIRELESS CHARGING TRANSMITTER OR RECEIVER

CROSS-REFERENCE TO RELATED APPLICATIONS

This application claims priority from Korean Patent Application No. 10-2016-0033939 filed on Mar. 22, 2016, in the Korean Intellectual Property Office, the disclosure of which is incorporated herein by reference in its entirety.

BACKGROUND OF THE INVENTION

Field of the Invention

The present invention relates to a metal frame for a device equipped with a wireless charging transmitter or receiver and, most particularly, to a metal frame for a device being equipped with a wireless charging transmitter or receiver including a plurality of perforation holes configured in at least one partial area of the metal frame, wherein the perforation hole has a diameter ranging from sub nm to several μm, and wherein an average distance between an arbitrary point A on a circumferential surface of a perforation hole, among the plurality of perforation holes, and an arbitrary point B on a circumferential surface of another perforation hole being adjacent to the perforation hole is equal to or less than a skin depth corresponding to a metallic material of the metal frame, and wherein point A and point B respectively correspond to points indicating a longest distance between the circumferential surfaces of each perforation hole to which point A and point B belong.

Discussion of the Related Art

The wireless charging technology has evolved at a remarkable rate and is being extensively applied in diverse types of appliances including mobile phones. Such wireless charging may also be referred to as non-contact charging and may be broadly divided into two different types: a method using electromagnetic induction and a method using magnetic resonance. The electromagnetic induction type charging technology corresponds to a method of charging batteries by generating an induced current between a charging pad and two coils provided inside a mobile phone. And, the charging method using magnetic resonance corresponds to a method of performing charging by sending out power through the same frequency to a transmitting/receiving end that is located at a distance 1 to 2 meters (m) away from the charging system.

The electromagnetic induction type charging method may be used in mobile devices, such as mobile phones, laptop computers, and so on, and also in electric vehicles. And, as the currently most widely used technology, the electromagnetic induction type charging method may use frequencies ranging from several hundreds of kilohertz (kHz) to several tens of megahertz (MHz). And, most particularly, in order to perform wireless charging of mobile phones, the electromagnetic induction type charging method generally uses frequencies within a range of 100 to 300 kHz.

Meanwhile, manufacturers of mobile devices, such as mobile phones, have consistently developed their technologies in order to maximize the performance of their mobile devices and, eventually, achieved their goal of realizing a state-of-the-art mobile device technology. Therefore, it has become more difficult for the manufacturers to create their own distinguished functions that are related to the performance of the device. Accordingly, the manufacturers are becoming more focused on the design of their mobile devices, and, therefore, the selection of the material for a frame configuring the outside feature of the mobile device has become one of the most important issues.

More specifically, until recently, in order to manufacture light-weight mobile devices, the manufacturers have mostly fabricated their mobile devices by using plastic material. However, due to the characteristics of the plastic material, there were limitations in realizing high-quality texture in the mobile devices. Accordingly, manufacturers are gradually seeking to replace the frames of their mobile devices to metal frames, which can provide diverse texture and more enhanced durability. Evidently, metal frames may be disadvantageous in the aspect of weight as compared to the plastic frames. However, due to the excellence in the design provided by the metal frame, the difference in weight between the two materials may not be significant.

Since near field communication (NFC) and diverse means of payment, such as Samsung Pay, and so on, which are mostly equipped in the mobile device, are operated by a frequency band sufficient enough to pass through metal, these may not be required to be considered when selecting the material for fabricating the frame of a mobile device. Nevertheless, since metal acts as a shielding material that blocks out the frequency band for performing wireless charging, a problem of being incapable of performing wireless charging may occur.

More specifically, as one of the functions included in the wireless charging technology, there exists a function of detecting metallic objects potentially causing danger that are within a close range of the wireless charging receiver via digital feedback between the wireless charging receiver and transmitter. This function is referred to as foreign object detection (FOD), and, when a foreign object is detected, the power transmission is stopped (or interrupted). Until recently, the frame for devices that are mostly used has been fabricated by using plastic material. Since a power line cannot pass through insulators (or non-conductors), such as plastic, heat may not be generated, or an extremely low level of heating may be performed. Accordingly, the foreign object detection function may not be performed. Therefore, as long as the plastic frame is applied to the mobile devices, problem may not occur in the wireless power transmission.

Heat (temperature) that is generated from a foreign object (metal) may correspond to a standard for detecting foreign objects when electronic magnetic waves are generated from a coil. And, when detecting the temperature that is generated from the foreign object (metal), as described above, and when the detected temperature is equal to or higher than a predetermined standard (generally 60° C.), the wireless charging system stops (or interrupts) the power transmission. Accordingly, there lies a disadvantage of not being able to apply a frame configured of a metallic material to a device that is equipped with a wireless charging transmitter or receiver.

Therefore, in order to comply with the mainstreaming of adopting metal frames to the external features of diverse devices, such as mobile devices, research and development of a frame enabling wireless charging despite the usage of a metal frame is urgently required.

SUMMARY OF THE INVENTION

Accordingly, the present invention is directed to a metal frame for a device being equipped with a wireless charging transmitter or receiver that substantially obviates one or more problems due to limitations and disadvantages of the related art.

A technical object of the present invention is to provide a metal frame for a device being equipped with a wireless charging transmitter or receiver capable of performing wireless charging by including at least a wireless charging receiver, i.e., enabling wireless charging to be carried out smoothly despite, for example, a mobile device having its outer feature equipped with a metal frame instead of a plastic frame, wherein the metal frame provides an excellent texture of premium quality and outstanding durability as compared to the plastic frame.

Also, another technical object of the present invention is to provide a metal frame for a device being equipped with a wireless charging transmitter or receiver having perforation holes formed on the metal frame, wherein the perforation holes are formed to have extremely small sizes so as to avoid degradation in the durability of the metal frame.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to an exemplary embodiment of the present invention, provided herein is a metal frame for a device being equipped with a wireless charging transmitter or receiver including a plurality of perforation holes configured in at least one partial area of the metal frame, wherein the perforation hole has a diameter ranging from sub nm to several μm, and wherein an average distance between an arbitrary point A on a circumferential surface of a perforation hole, among the plurality of perforation holes, and an arbitrary point B on a circumferential surface of another perforation hole being adjacent to the perforation hole is equal to or less than a skin depth corresponding to a metallic material of the metal frame, and wherein point A and point B respectively correspond to points indicating a longest distance between the circumferential surfaces of each perforation hole to which point A and point B belong.

Preferably, the perforation hole may be processed by using laser.

Preferably, a thickness of the metal frame at an arbitrary point may be equal to or less than the skin depth.

Preferably, the metal frame may be formed of aluminum.

Preferably, a surface of the metal frame may be processed with anodizing treatment after forming perforation holes on the surface of the metal frame.

Preferably, the metal frame may be installed in a position opening and closing a main transmission direction or main receiving direction of a wireless transmitter or receiver in the device.

Additionally, in another aspect of the present invention, provided herein is a metal frame for a device being equipped with a wireless charging transmitter or receiver including a slit configured to form at least one continuous slit in at least one partial area of the metal frame, wherein the slit has a width ranging from sub nm to several μm, wherein an average value of distances between an arbitrary point C of the slit and a nearest point D, among arbitrary points, of another slit being adjacent to the slit is equal to or less than a skin depth corresponding to a metallic material of the metal frame, and wherein point C and point D correspond to arbitrary points of a circumferential surface corresponding to relatively distant points located on the circumferential surface of each slit.

Preferably, the slit may be processed by using laser.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, the exemplary embodiments of the present invention will be illustrated in the appended drawings and described in detail in the detailed description of the present invention. In describing the present invention, when it is determined that the detailed description on a related disclosed technology may cause ambiguity in the concept (or idea) of the present invention, the detailed description of the same will be omitted for simplicity.

The terms used in the description of the present invention are defined based on their corresponding functions within the present invention. And, since the meaning of such terms may vary in accordance with the intentions or practices of anyone skilled in the art, the definition of the terms used in the description of the present invention should be understood based on the overall context of this specification.

Although the metal frame mentioned in the present invention may mainly correspond to a finishing frame (outer cover) configuring an outer feature of a target device, the meaning of the term will not be limited only to this. And, therefore, the metal frame may also correspond to a D cover formed inside a finishing frame, and the metal frame may also refer to all forms of frames that are required for configuring other types of devices. Hereinafter, the metal frame will be mostly described as a finishing frame.

Furthermore, a device or apparatus that is mentioned herein refers to a concept including both a device receiving power, such as a mobile phone, and a device transmitting power, such as a charging device.

Reference will now be made in detail to the preferred embodiments of the present invention, examples of which are illustrated in the accompanying drawings. Wherever possible, the same reference numbers will be used throughout the drawings to refer to the same or like parts.

Figure 1:
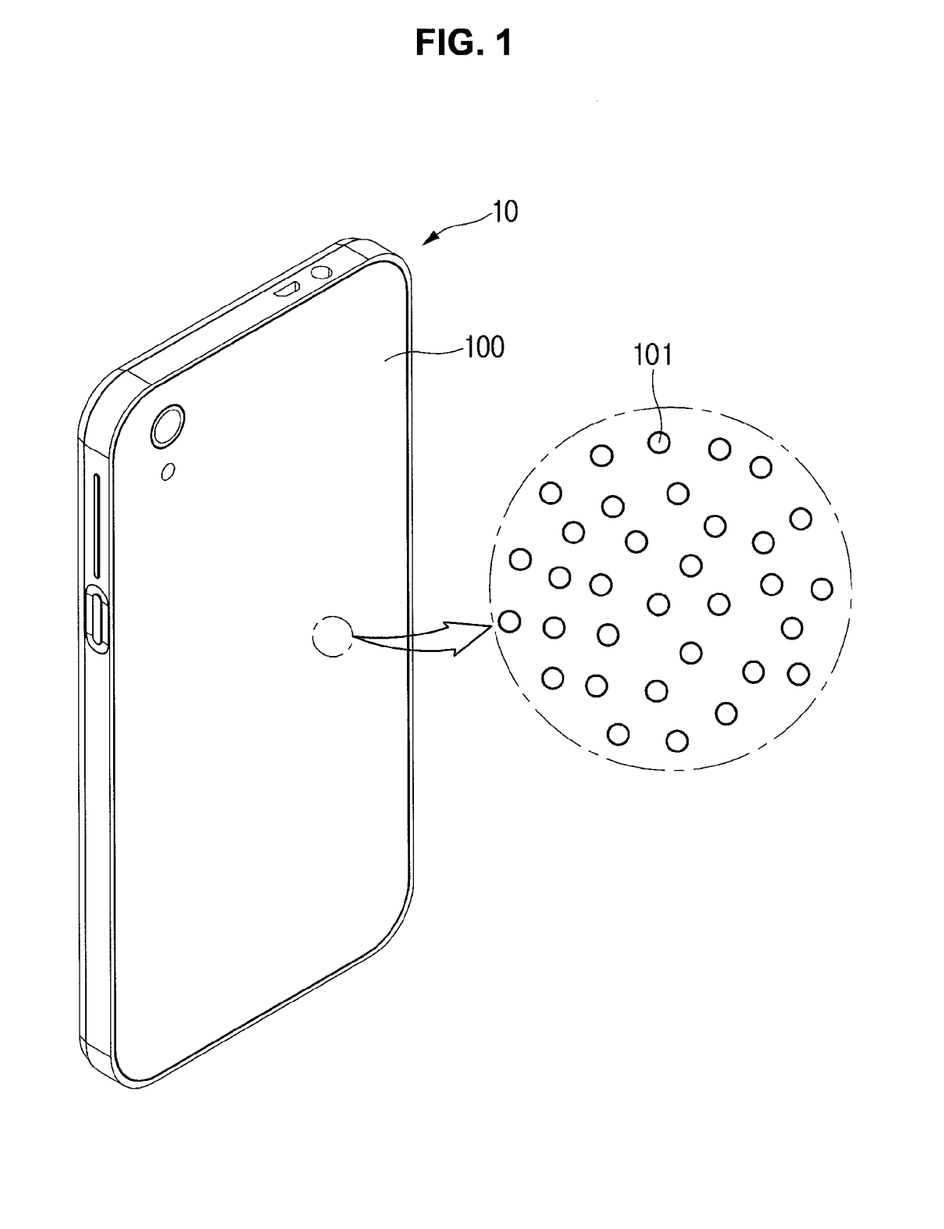
FIG. 1 illustrates a metal frame for a mobile phone according to an exemplary embodiment of the present invention and an enlarged view of its surface.
Figure 2:
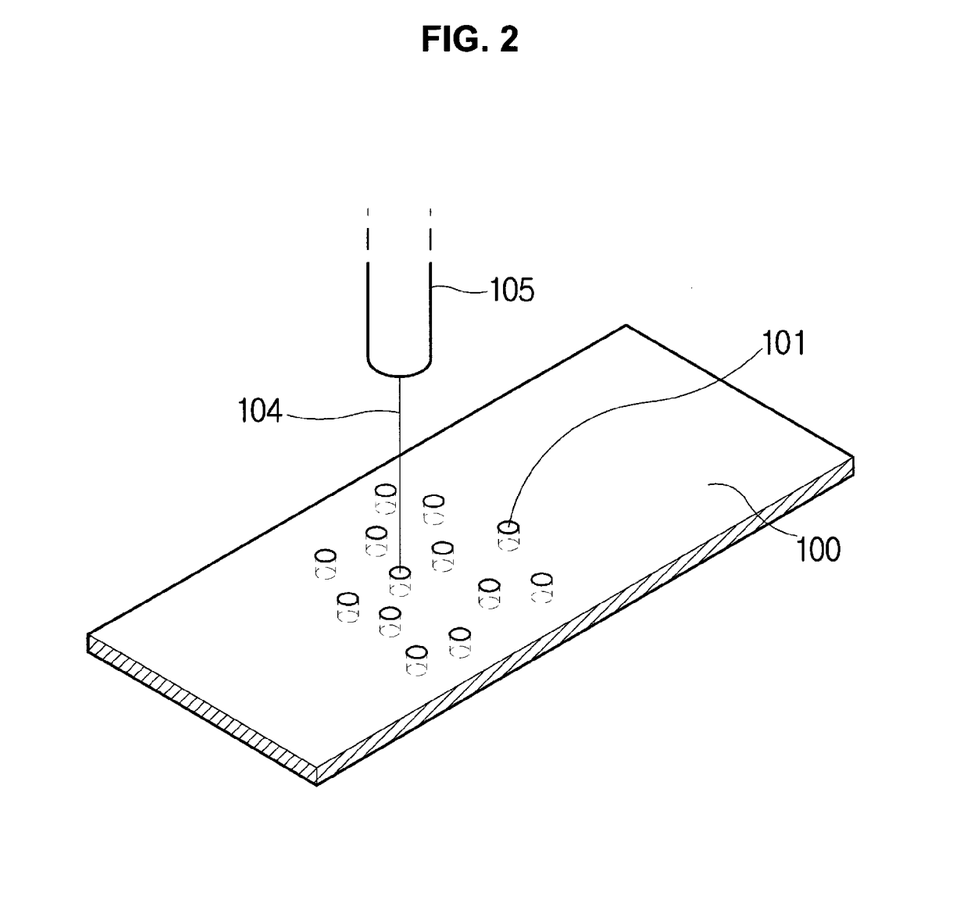
FIG. 2 illustrates a diagram for describing a method of processing with laser a surface of the metal frame according to the exemplary embodiment of the present invention.

FIG. 1 illustrates a metal frame for a mobile phone according to an exemplary embodiment of the present invention and an enlarged view of its surface, and FIG. 2 illustrates a diagram for describing a method of processing with laser a surface of the metal frame according to the exemplary embodiment of the present invention.

As shown in the drawing, according to the exemplary embodiment of the present invention, a plurality of perforation holes each having a size ranging from sub nm to several μm. Evidently, it will be apparent that a receiver coil that is configured to perform wireless charging is included in the mobile phone.

Generally, the perforation hole having a size of several μm or less is not easily seen through a naked eye. And, therefore, an apparent differentiation between a metal frame having perforation holes of the above-described size formed thereon and a metal frame not having any perforation holes formed thereon.

The perforation hole is restricted to several μm or less for the following reason. In case the size of the perforation hole becomes larger than the size that is mentioned above, thereby becoming recognizable by the naked eye, the texture of the frame having such perforation holes formed thereon may become completely different. And, moreover, the visual expression and communication of the design that is embodied on such frame may be restricted. Therefore, in order to use a metal frame having a similar texture as a metal frame having no perforation holes formed thereon, forming perforation holes having the above-described size is important.

A diameter of the perforation hole may be processed by setting its minimum value to sub nm along with the distance between slits, which will be described later on. Although the minimum value may be referred to as a limit of laser processing, with the evolution in the laser processing technology in the future, this minimum value (or limitation value) may be lowered.

Meanwhile, the perforation hole may be formed to have a circular shape and may also be formed to have a polygonal shape or an indeterminate (or irregular) shape. Therefore, there is no particular restriction in the shape or form of the perforation hole.

Figure 3:
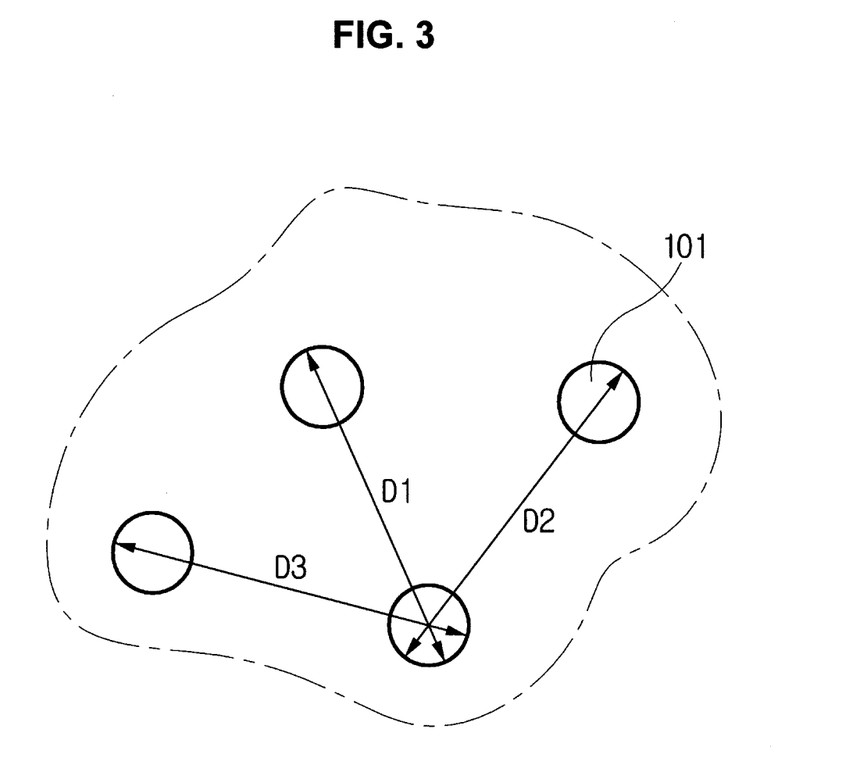
FIG. 3 illustrates a diagram for describing a longest distance among diverse distances between perforation holes formed on the surface of the metal frame according to the exemplary embodiment of the present invention.
Figure 4:
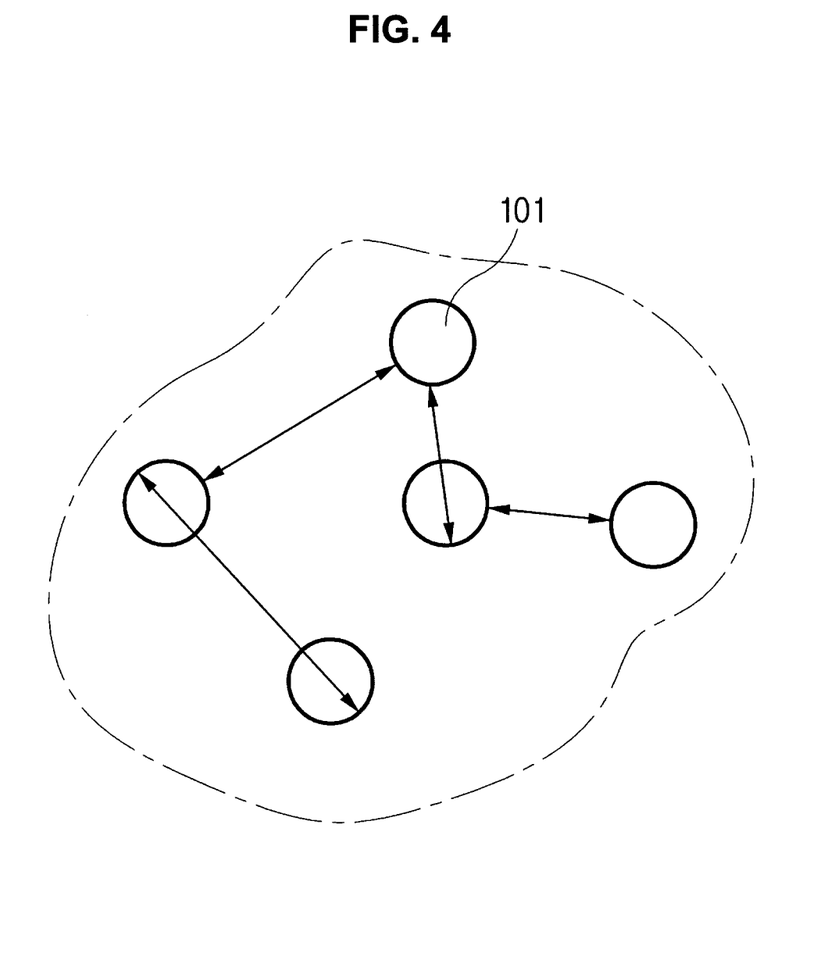
FIG. 4 illustrates a diagram for describing distances between multiple adjacent perforation holes formed on the surface of the metal frame according to the exemplary embodiment of the present invention.

FIG. 3 illustrates a diagram for describing a longest distance among diverse distances between perforation holes formed on the surface of the metal frame according to the exemplary embodiment of the present invention, and FIG. 4 illustrates a diagram for describing distances between multiple adjacent perforation holes formed on the surface of the metal frame according to the exemplary embodiment of the present invention.

As shown in the drawing(s), a distance between the perforation hole and its adjacent (or neighboring) perforation hole should be limited. More specifically, among distances between one arbitrary point on a circumferential surface of one perforation hole and one arbitrary point on a circumferential surface of another perforation hole, a longest distance should be less than or equal to a skin depth, which will be described later on.

The skin depth is based on an average value, and, in FIG. 3, the skin depth is determined by an average value of D1, D2, and D3. Herein, the distance between the perforation holes that is used as a standard for the skin depth may be diversely measured, as shown in FIG. 4. Evidently, the average value of the above-described longest distance shall correspond to a greatest value, and the greatest value shall be equal to or less than the skin depth.

Herein, the skin depth corresponds to a theory that is established in association with the power transmission, and, therefore, a detailed description of the skin depth is not required. Nevertheless, in order to facilitate the understanding of the present invention, the skin depth will hereinafter be briefly described. The skin depth refers to a depth to which electromagnetic waves penetrate inside a matter (or material) on average and may also be referred to as a penetration depth.

The skin depth is related to a skin effect, which refers to a tendency of current density to become larger at a surface of a conductor rather than its center when electric current flows through the conductor. When it is assumed that the conductor is formed to have a cylindrical shape and that the electric current flows through the conductor along its longitudinal direction, a distribution of the current density within the conductor is not uniform. Due to a large number of magnetic fluxes being linked to the electric current at the center of the conductor, inductance becomes partially larger. As a cross-section and a conductivity of the frequency or the conductor become larger, the skin effect becomes greater.

When it is assumed that an electric current I flows through a conducting wire, a magnetic field is generated in the conducting wire. When this magnetic field is temporally changed, an electromotive force is generated along a direction obstructing (or disturbing) a change in the magnetic field due to Faraday's law of electromagnetic induction. An electric current Iw that is generated by the above-described electromotive force is referred to as an eddy current. Theoretically, when the above-described eddy current is combined with the initial current, the eddy current is subtracted at the center (I−Iw), and the eddy current is added at the surface (I+Iw). Accordingly, the magnetic field inside the conducting wire becomes smaller at a fast rate. Therefore, due to this phenomenon, the above-described skin effect occurs inevitably.

Each matter (or material) has a unique threshold depth at which the skin effect becomes apparent, and this skin depth (or penetration depth) may act as an indicator defining the characteristics of the matter (or material).

Although the skin depth has a unique value in accordance with the matter (or material), as described above, the skin depth may vary even in the same matter (or material)

depending upon the frequency, and, most particularly, the skin depth and the frequency establishes an inverse variation.

For example, based on 100 kHz, which corresponds to a bandwidth allowing wireless power transmission, the skin depth is measured to be equal to approximately 270 μm for aluminum (Al), approximately 200 μm for copper (Cu), approximately 30 μm for steel 401, approximately 7.5 μm for iron-silicon alloy (Fe—Si), and approximately 1.3 μm for iron-nickel alloy (Fe—Ni).

More specifically, when power is transmitted at an alternating current of 100 kHz, the skin effect is apparent at the above-mentioned skin depth or lower, and the flow of the electric current becomes more intense as it approaches the surface. Conversely, this indicates that an electric resistance R becomes smaller under the same voltage V. The present invention relates to processing a metal frame so that its electric resistance R can become lower throughout the entire area of the metal frame.

When detecting foreign objects by using the foreign object detection (FOD) function, as described above, whether or not a detected object corresponds to a foreign object is detected based on a temperature that is measured from the corresponding foreign object. Unless the detected foreign object corresponds to a complete insulator (or non-conductor), the measured temperature is proportional to the size of the electric resistance that is generated when electric current flows through the detected object. And, such electric resistance is associated with an electric characteristic, size, thickness, and so on, of the detected foreign object.

For example, of the electric resistance of the foreign object can be reduced, the temperature that is generated from the foreign object when electric current passes through may become relatively lower, and, accordingly, the foreign object detection (FOD) function may fail to determine the detected object as a foreign object.

Generally, a metal is an electric conductor, and, when electric current passes through, resistance may be generated in accordance with the size or thickness, and so on, of the metal. Accordingly, if the frame is fabricated by using a metallic material, and, for example, if the frame is used as a finishing frame (outer cover) of the mobile phone, the foreign object detection function may determine the frame as a foreign object and may stop the power transmission for wireless charging. This process is as described above.

However, according to the above-described theory, since the electric current flows smoothly within a depth limit (e.g., the area near the surface of the cylindrical conducting wire), the resistance is low. Conversely, the resistance is high at a depth exceeding the depth limit (e.g., the central area of the cylindrical conducting wire), where it is relatively difficult for the electric current to flow smoothly. Therefore, if the metal frame is designed by considering such skin depth, the foreign object detection function may not determine the metal frame as a foreign object. The present invention has been devised based on the above-described theory.

More specifically, a portion of the metal frame where the perforation holes are formed corresponds to an area where air exists, and, therefore, this portion is determined as an insulator (or non-conductor). And, the metal frame area existing between the perforation holes, i.e., a conducting area establishes a relation with the skin depth. More specifically, when a distance between an arbitrary point on a circumferential surface of a perforation hole formed on the metal frame and an arbitrary point of a circumferential surface of an adjacent (or neighboring) perforation hole is measured, a distance that is measured to have a longest value is set to be equal to or less than the skin depth. Accordingly, the distance between perforation holes at any one point within all electric current paths (metal areas) is within the range of the skin depth. Thus, the above-described skin effect occurs in the entire area of the metal frame.

Therefore, when electric current passes through, the metal frame, which is processed as described above, may indicate a temperature value that is equal to or below a predetermined standard value when measured by the foreign object detection function. Accordingly, no restriction exists in the wireless charging.

Evidently, when required, for the temperature value that is set as a standard value by the foreign object detection, the standard value may be adjusted to a temperature value that is measured from the processed metal frame. Even if the standard temperature value is adjusted as described above, as long as the skin effect is being used, the temperature will not be excessively adjusted to a point that causes difficulty in handling the mobile phone, and so on.

Although the area where the perforation holes are formed (or perforation hole formation area) may be applied throughout the entire metal frame, when required, the perforation hole formation area may also be partially formed only in an area corresponding to an area where a coil for receiving or transmitting wireless charging.

Figure 5:
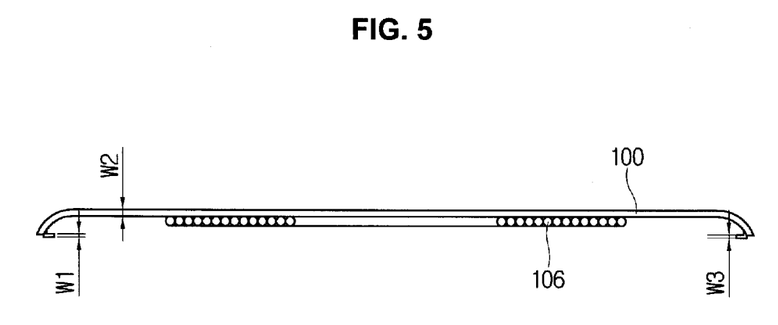
FIG. 5 illustrates a cross-sectional view showing a thickness of the metal frame according to the exemplary embodiment of the present invention.

FIG. 5 illustrates a cross-sectional view showing a thickness of the metal frame according to the exemplary embodiment of the present invention. In FIG. 5, the thickness (or width) of each point is respectively indicated as W1, W2, and W3.

Preferably, the skin effect should be applied throughout the entire area of the metal frame. However, as shown in the drawing, it is preferable that such thickness value within the entire area of the metal frame is set to be equal to or less than the skin depth.

Evidently, even in case the above-described thickness level is not necessarily satisfied in comparison with the maximum temperature that can be tolerated by the foreign object detection function, if the temperature that can be measured is low, the skin depth is not necessarily required to be applied to up to the thickness of the metal frame.

Figure 6:
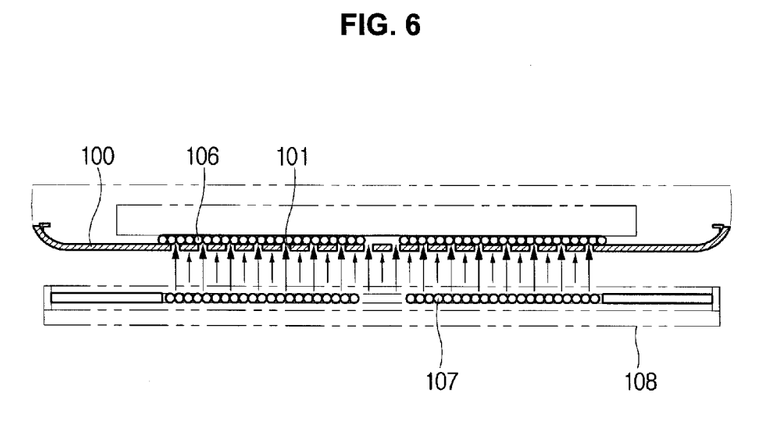
FIG. 6 illustrates a cross-sectional view of a power receiving direction of a mobile phone adopting the metal frame according to the exemplary embodiment of the present invention and a position of the metal frame and a cross-sectional view of a power transmitting direction of a power transmitting device and a position of the metal frame.

FIG. 6 illustrates a cross-sectional view of a power receiving direction of a mobile phone adopting the metal frame according to the exemplary embodiment of the present invention and a position of the metal frame and a cross-sectional view of a power transmitting direction of a power transmitting device and a position of the metal frame.

As shown in the drawing, the metal frame may be installed at a position that opens and closes a main transmission direction or a main receiving direction of a wireless charging transmitter or receiver. Herein, the metal frame prior to being processed by the present invention has an opening and closing function. However, since the metal frame that is processed by the present invention is determined as an insulator (or non-conductor) by the foreign object detection function, the mobile frame is no longer capable of performing the opening and closing functions. More specifically, the power may be delivered to both the area where the perforation holes are formed and the area where the perforation holes are not formed.

Figure 7:
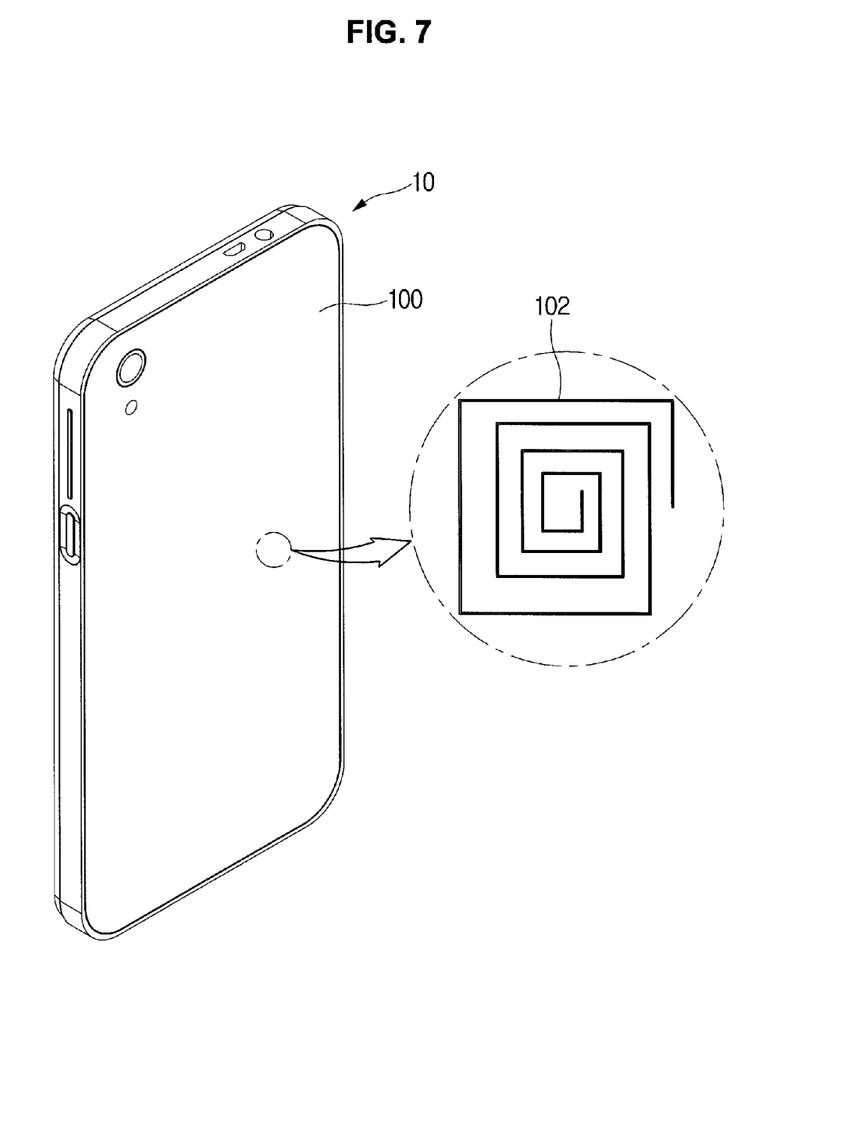
FIG. 7 illustrates a metal frame for a mobile phone according to another exemplary embodiment of the present invention and an enlarged view of its surface.
Figure 8:
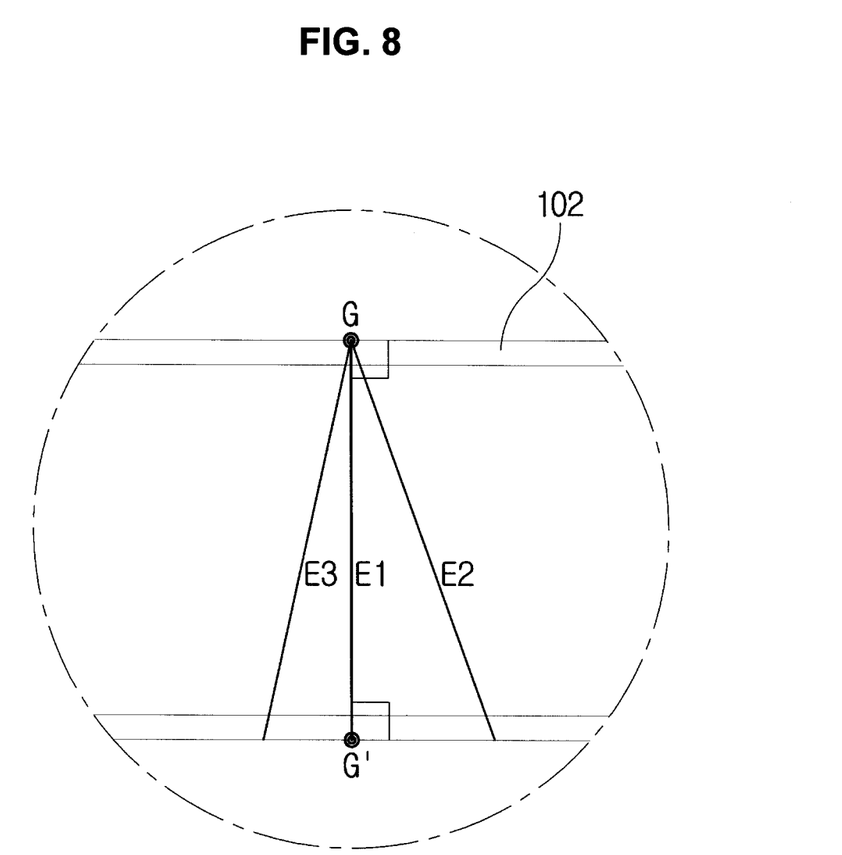
FIG. 8 illustrates a diagram for describing a width of a slit formed on the surface of the metal frame according to the exemplary embodiment of the present invention and a shortest distance among diverse distances between the slits.
Figure 9:
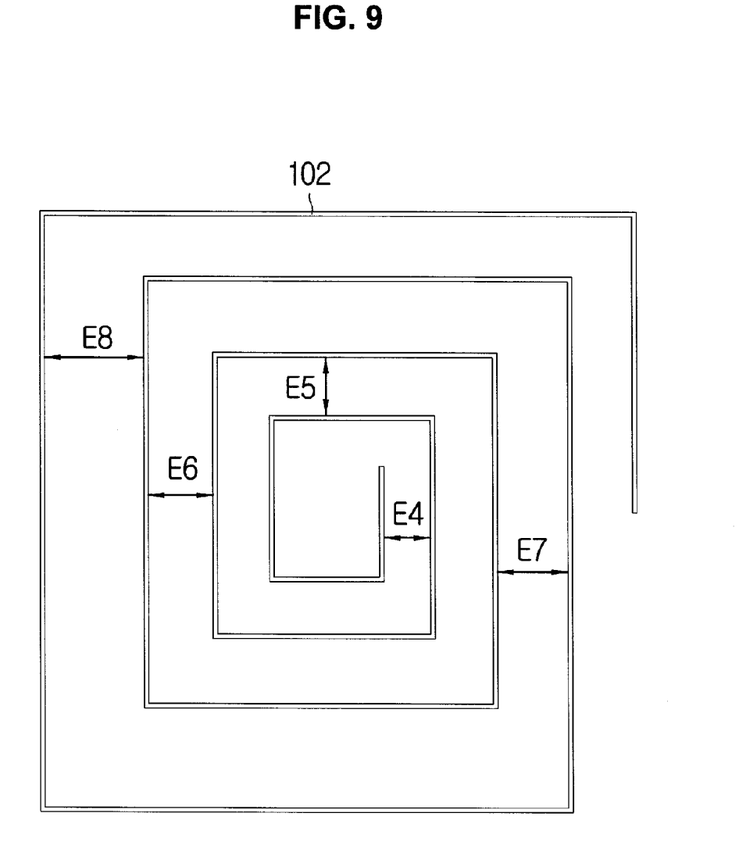
FIG. 9 illustrates a diagram for describing diverse distances between slits according to the other exemplary embodiment of the present invention.
Figure 10:
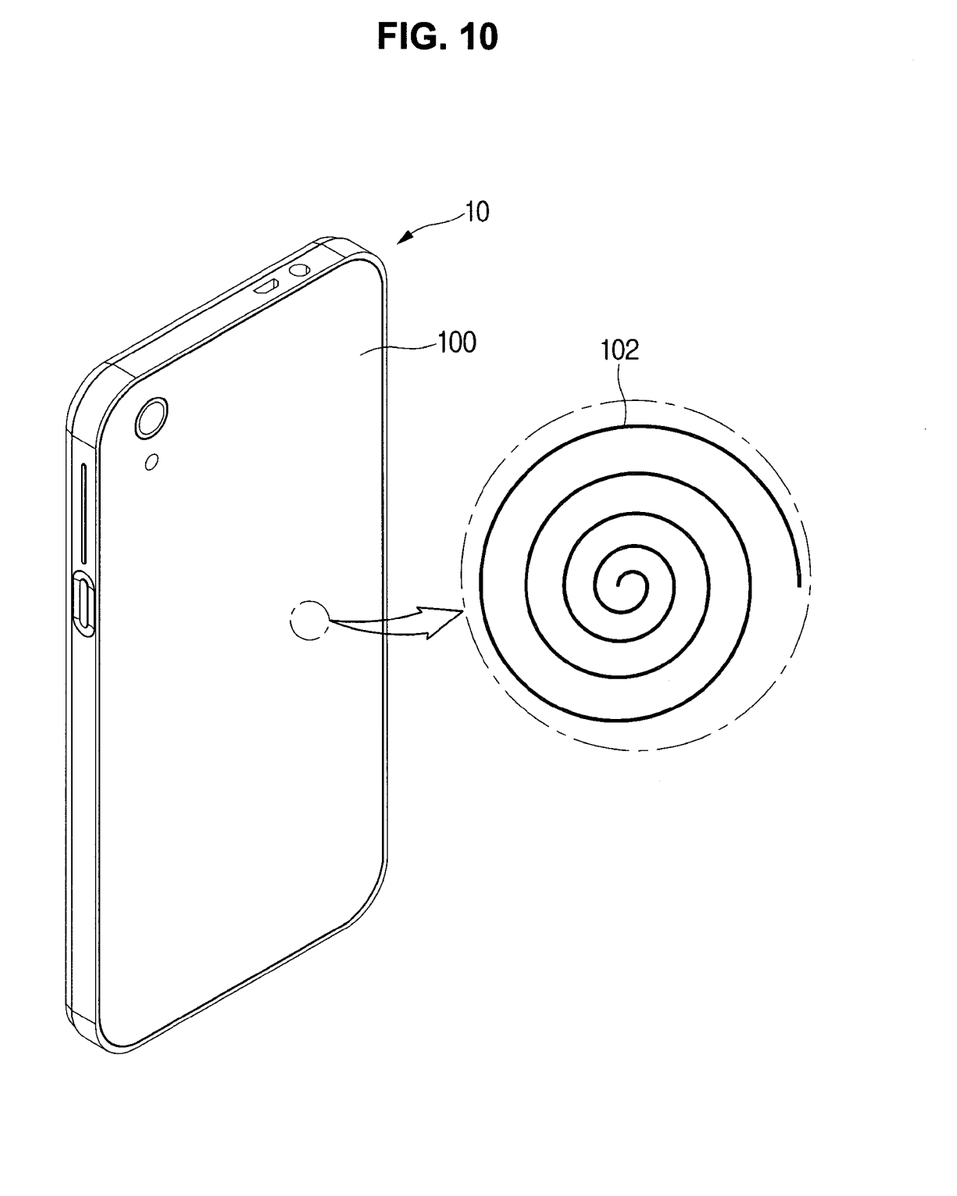
FIG. 10 illustrates a metal frame for a mobile phone according to yet another exemplary embodiment of the present invention and an enlarged view of its surface.

FIG. 7 illustrates a metal frame for a mobile phone according to another exemplary embodiment of the present invention and an enlarged view of its surface. FIG. 8 illustrates a diagram for describing a width of a slit formed on the surface of the metal frame according to the exemplary embodiment of the present invention and a shortest distance among diverse distances between the slits. FIG. 9 illustrates a diagram for describing diverse distances between slits according to the other exemplary embodiment of the present invention. And, FIG. 10 illustrates a metal frame for a mobile phone according to yet another exemplary embodiment of the present invention and an enlarged view of its surface.

As shown in the drawing(s), according to another exemplary embodiment of the present invention, by forming a slit on the metal frame, wireless charging may be performed. The theory of the skin depth (or penetration depth) is the same as the theory that is applied to the perforation hole as described above. However, according to the other exemplary embodiment of the present invention, a slit is adopted instead of the perforation holes, and the slit may correspond to one continuous slit, or the slit may correspond to a plurality of slits intermittently provided so as to be adjacent to one another.

FIG. 7 to FIG. 10 illustrate a single continuous slit configured to have a circular or rectangular spiral line. If the spiral line is continuously formed without any discontinuity, this corresponds to the single continuous spiral line. And, if the spiral line is discontinued in between, this corresponds to the plurality of slits. However, in case the slit is discontinued, two of the discontinued slits are adjacent to one another, and if a distance between two discontinued points corresponds to a distance between two slits, the distance should also be equal to or less than the skin depth. And, even if the distance is greater than the skin depth, an average value of all measurable distances should be equal to or less than the skin depth.

Meanwhile, the slit may have a width ranging from sub nm to several $\mu$m, and the slit is processed by using laser, just as the perforation holes.

An average value of nearest distances between an arbitrary point C of the slit and an arbitrary point B of another slit being adjacent to the slit should be equal to or less than a skin depth corresponding to a metallic material of the metal frame. In FIG. 8, a value of E1 indicates the nearest distance, and E2 and E3 may be said to correspond to relatively long distances. The length of the distances decreases by an order of E2, E3, and E1. FIG. 9 illustrates minimum widths between diverse slits, and, for example, the average value of E4 to E8, which are indicated in FIG. 9, should be equal to or less than the skin depth. Evidently, in some cases, a number of minimum values between slits for deducing the average skin depth may be equal to a considerable number of minimum values.

However, when measuring the distance between such slits, as shown in FIG. 8, it will be preferable that points C and D respectively correspond to arbitrary points G and G' of a circumferential surface corresponding to relatively distant points located on the circumferential surface of each slit.

Evidently, the slit is processed by using laser, just as the perforation holes.

In case the metal frame having the above-described perforation holes and slits formed thereon corresponds to aluminum, the metal frame may be processed with anodizing treatment for diverse embodiment of a surface design pattern. The anodizing treatment corresponds to forming an oxide film on an aluminum layer. However, since diverse blow holes (or gas holes) and fibrous forms exist on the surface of the aluminum layer, the aluminum layer may be easily dyed to diverse colors, which is advantageous in forming diverse surface design patterns.

Herein, the oxide film that is formed during the anodizing process may also be developed in the perforation holes or slit(s). However, the space inside the perforation holes and slit(s) may be considered as an insulator (or non-conductor), and, accordingly, even if an oxide film layer, which is an insulator (or non-conductor), exists inside the perforation holes or slit(s), the presence of the oxide film layer will not cause any problem. More specifically, it will be understood that the presence of the oxide film layer will not act as a factor that disturbs (or obstructs) the wireless charging function. Nevertheless, for the efficiency in the procedure, it will be preferable to perform the anodizing procedure after performing the process of forming the perforation holes or slit(s).

In the present invention, after equipping a device with a metal frame that is processed with perforation holes and/or slit(s) as a cover of the device, the temperature that is measured when performing wireless charging is checked, and, then, the checked temperature is compared with a temperature that is measured from a cover of a metal frame that is not processed with perforation holes and/or slit(s).

Based on the compared result, the metal frame according to the present invention measured approximately 55° C. after being operated for 5 minutes, whereas the metal frame having no perforation holes and/or slit(s) formed thereon measured over 70° C. even before reaching 3 minutes of operation time.

Based on this evaluation, the metal frame according to the present invention is sufficiently suitable for being applied as the outer frame of a device being equipped with a wireless charging system.

As described above, the metal frame for a device being equipped with a wireless charging transmitter or receiver have the following advantages. According to an exemplary embodiment of the present invention, the metal frame for a device being equipped with a wireless charging transmitter or receiver is expected to perform wireless charging by including at least a wireless charging receiver, i.e., enabling wireless charging to be carried out smoothly despite equipping a mobile device with a metal frame for its outer feature instead of a plastic frame, wherein the metal frame provides an excellent texture of premium quality and outstanding durability as compared to the plastic frame.

Also, the metal frame for a device being equipped with a wireless charging transmitter or receiver having perforation holes formed on the metal frame is expected to avoid degradation in the durability of the metal frame by having its perforation holes are formed in extremely small sizes.

It will be apparent to those skilled in the art that various modifications and variations can be made in this specification without departing from the spirit or scope of this specification. Thus, it is intended that this specification covers the modifications and variations of this invention provided they come within the scope of the appended claims and their equivalents. It is also apparent that such variations of this specification are not to be understood individually or separately from the technical scope or spirit of this specification.

What is claimed is:

1. A metal frame for a device being equipped with a wireless charging transmitter or receiver, comprising:
   a plurality of perforation holes configured in at least one partial area of the metal frame,
   wherein the perforation hole has a diameter ranging from sub nm to several $\mu$m, and wherein an distance between an arbitrary point A on a circumferential surface of a perforation hole, among the plurality of perforation holes, and an arbitrary point B on a circumferential surface of another perforation hole being adjacent to the perforation hole is equal to or less than a skin depth corresponding to a metallic material of the metal frame, and wherein point A and point B correspond to points indicating a longest distance between the circumferential surfaces of each perforation hole to which point A and point B belong.

2. The metal frame of claim 1, wherein the perforation hole is processed by using laser.

3. The metal frame of claim 1, wherein a thickness of the metal frame at an arbitrary point is equal to or less than the skin depth.

4. The metal frame of claim 1, wherein the metal frame is formed of aluminum.

5. The metal frame of claim 4, wherein a surface of the metal frame is processed with anodizing treatment after forming perforation holes on the surface of the metal frame.

6. The metal frame of claim 1, wherein the metal frame is installed in a position opening and closing a main transmission direction or main receiving direction of a wireless transmitter or receiver in the device.

7. A metal frame for a device being equipped with a wireless charging transmitter or receiver, comprising:

a slit configured to form at least one continuous slit in at least one partial area of the metal frame, wherein the slit has a width ranging from sub nm to several µm, wherein an average value of distances between an arbitrary point C of the slit and a nearest point D, among arbitrary points, of another slit being adjacent to the slit is equal to or less than a skin depth corresponding to a metallic material of the metal frame, and wherein point C and point D correspond to arbitrary points of a circumferential surface corresponding to relatively distant points located on the circumferential surface of each slit.

8. The metal frame of claim 7, wherein the slit is processed by using laser.

* * * * *